(12) United States Patent
Ishikawa

(10) Patent No.: US 11,299,064 B2
(45) Date of Patent: Apr. 12, 2022

(54) INFORMATION SUPPLY DEVICE, INFORMATION SUPPLY METHOD, AND STORAGE

(71) Applicant: HONDA MOTOR CO., LTD., Tokyo (JP)

(72) Inventor: Yosuke Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 135 days.

(21) Appl. No.: 16/548,860

(22) Filed: Aug. 23, 2019

(65) Prior Publication Data

US 2020/0070683 A1 Mar. 5, 2020

(30) Foreign Application Priority Data

Sep. 4, 2018 (JP) .............................. JP2018-165363

(51) Int. Cl.
| | | |
|---|---|---|
| *H02J 7/00* | (2006.01) | |
| *B60L 58/16* | (2019.01) | |
| *G07C 5/06* | (2006.01) | |
| *B60L 58/12* | (2019.01) | |
| *B60L 58/18* | (2019.01) | |

(52) U.S. Cl.
CPC .............. *B60L 58/16* (2019.02); *B60L 58/12* (2019.02); *B60L 58/18* (2019.02); *G07C 5/06* (2013.01)

(58) Field of Classification Search
CPC .......... B60L 58/16; B60L 58/12; B60L 58/18; B60L 2260/50; B60L 2260/52; B60L 3/12; B60L 2250/16; B60L 58/10; B60L 2240/70; B60L 2260/54; G07C 5/06; G07C 5/0825; Y02T 10/70; H04L 67/12

USPC .................................... 320/109, 134; 701/22
See application file for complete search history.

(56) References Cited

U.S. PATENT DOCUMENTS

2009/0040033 A1* 2/2009 Uchida ............. H01M 10/4285
340/439

FOREIGN PATENT DOCUMENTS

| JP | 2004-199325 | 7/2004 |
|---|---|---|
| JP | 2007-274806 | 10/2007 |
| JP | 2016-178052 | 10/2016 |
| JP | 2018-061364 | 4/2018 |
| JP | 2018-098931 | 6/2018 |

OTHER PUBLICATIONS

Japanese Office Action for Japanese Patent Application No. 2018-165363 dated Oct. 26, 2021.

* cited by examiner

Primary Examiner — Zixuan Zhou
(74) Attorney, Agent, or Firm — Amin, Turocy & Watson, LLP

(57) ABSTRACT

An information supply device includes an acquirer configured to acquire information regarding a degree of deterioration of a secondary battery for supplying travel power of a vehicle, a deriver configured to derive performance of the secondary battery based on the information acquired by the acquirer, and a display controller configured to cause a display to display an image indicating information regarding performance of the secondary battery, the performance indicated by the image being lower than the performance derived by the deriver.

6 Claims, 8 Drawing Sheets

INFORMATION SUPPLY DEVICE, INFORMATION SUPPLY METHOD, AND STORAGE

CROSS-REFERENCE TO RELATED APPLICATIONS

This application is based upon and claims the benefit of priority from Japanese Patent Application No. 2018-165363, filed on Sep. 4, 2018; the entire contents of which are incorporated herein by reference.

BACKGROUND OF THE INVENTION

Field of the Invention

The present invention relates to an information supply device, an information supply method, and a storage.

Description of Related Art

There are electrically driven vehicles in which traveling motors are mounted and hybrid vehicles including traveling motors and engines. Motors mounted in vehicles are supplied with power by secondary batteries such as batteries to be driven. In secondary batteries, problems such as a decrease in a charging amount due to deterioration occur. Accordingly, there is a technology for displaying the degree of deterioration in a secondary battery and informing a user of the degree of deterioration (for example, see Japanese Unexamined Patent Application, First Publication No. 2007-274806).

SUMMARY OF THE INVENTION

When the degree of deterioration in a secondary battery is displayed, a user can recognize a time to repair and exchange the secondary battery based on the degree of deterioration in the secondary battery. However, the user delays the repairing or exchanging of the secondary battery in some cases. In these cases, the secondary battery may not be repaired or exchanged at an appropriate time in some cases. When only information close to reality is supplied, it is estimated that the user will feel dissatisfied with a short lifetime of the secondary battery.

The present invention is devised in view of such circumstances and an object of the present invention is to provide an information supply device, an information supply method, and a storage capable of effectively reducing dissatisfaction of a user by supplying conservative information.

An information supply device, an information supply method, and a storage according to aspects of the present invention have the following configurations.

(1) An information supply device according to an aspect of the present invention includes an acquirer configured to acquire information regarding a degree of deterioration of a secondary battery for supplying travel power of a vehicle, a deriver configured to derive performance of the secondary battery based on the information acquired by the acquirer, and a display controller configured to cause a display to display an image indicating information regarding performance of the secondary battery, the performance indicated by the image being lower than the performance derived by the deriver.

(2) In the information supply device in (1), the information regarding the degree of deterioration in the secondary battery includes a battery capacity of the secondary battery or information for deriving the battery capacity, and the information regarding the performance of the secondary battery includes a travelable distance of the vehicle.

(3) In the information supply device in (2), the display controller is configured to cause the display to display the travelable distance of the vehicle calculated based on the battery capacity in a case in which the battery capacity is less than an initial battery lower limit capacity and cause the display to display the travelable distance of the vehicle calculated based on the initial battery lower limit capacity instead of the battery capacity in a case in which the battery capacity is equal to or greater than the initial battery lower limit capacity.

(4) In the information supply device in (1), the deriver is configured to derive a deterioration ratio of the secondary battery based on the information regarding the degree of deterioration of the secondary battery and derive a residual lifetime until the derived deterioration ratio reaches a predetermined deterioration ratio as information indicating the performance of the secondary battery.

(5) In the information supply device in (4), the display controller is configured to cause the display to display a residual lifetime shorter than the residual lifetime derived by the deriver as a display residual lifetime.

(6) In the information supply device in (5), the deriver is configured to calculate an actual residual lifetime of a secondary battery mounted in a target vehicle and correct the actual residual lifetime to be shorter than that of the secondary battery mounted in the target vehicle to derive the display residual lifetime.

(7) An information supply method according to another aspect of the present invention causes a computer to acquire information regarding a degree of deterioration of a secondary battery for supplying travel power of a vehicle, derive performance of the secondary battery based on the acquired information, and cause a display to display an image indicating information regarding performance of the secondary battery, the performance indicated by the image being lower than the derived performance.

(8) A non-transitory computer-readable storage medium according to still another aspect of the present invention stores a computer program to be executed by a computer to perform at least acquiring information regarding a degree of deterioration of a secondary battery for supplying travel power of a vehicle, deriving performance of the secondary battery based on the acquired information, and causing a display to display an image indicating information regarding performance of the secondary battery, the performance indicated by the image being lower than the derived performance.

According to (1) to (8), it is possible to effectively reduce dissatisfaction of a user by supplying conservative information.

DETAILED DESCRIPTION OF THE INVENTION

Hereinafter, embodiments of an information supply device, an information supply method, and a storage according to the present invention will be described with reference to the drawings. In the following description, a vehicle 10 is assumed to be an electric motor vehicle. The vehicle 10 may be a vehicle in which a secondary battery supplying traveling power of the vehicle 10 is mounted or may be a hybrid motor vehicle or a fuel electric vehicle.

First Embodiment

[Overall Configuration]

Figure 1:
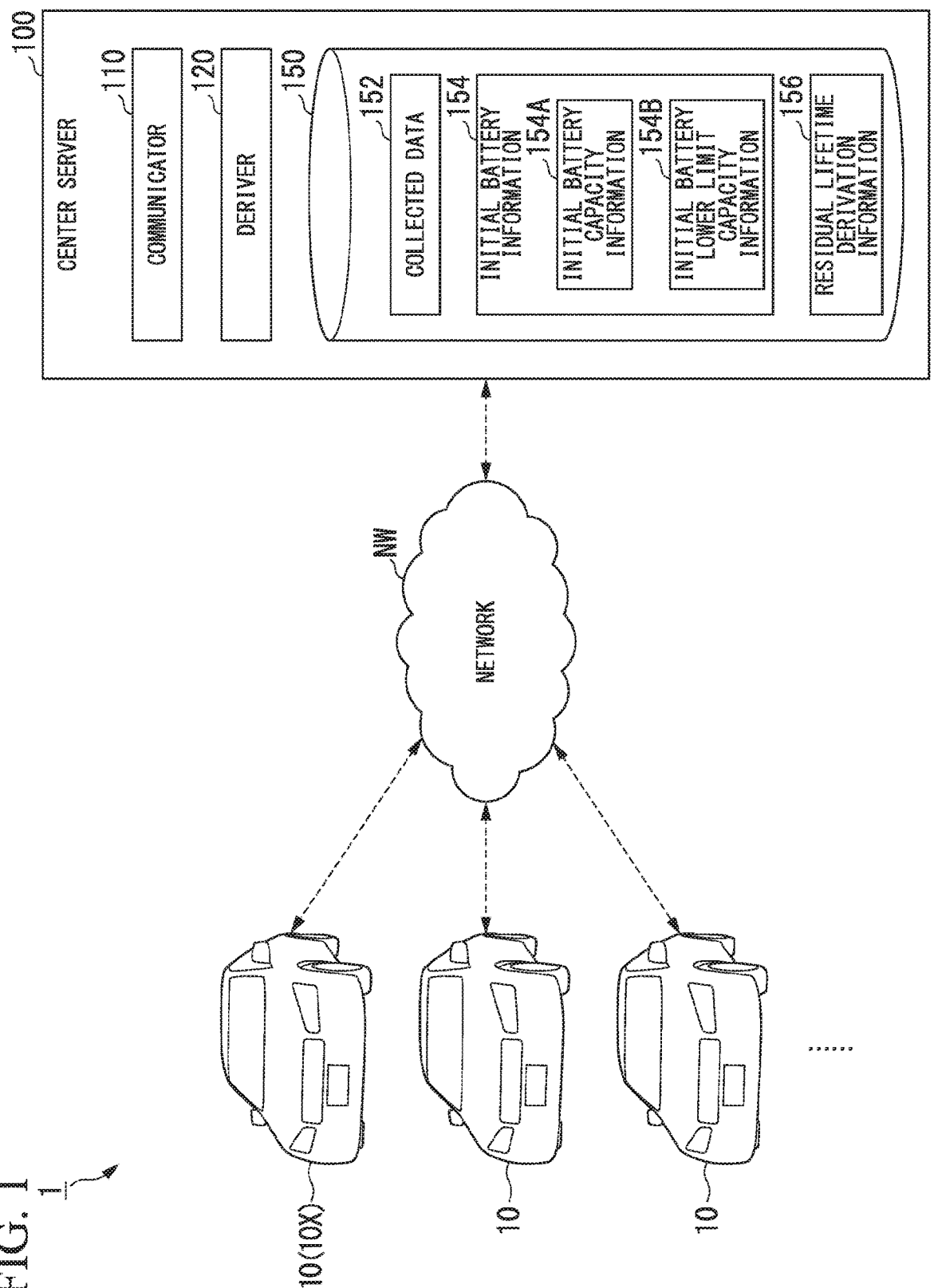
FIG. 1 is a diagram showing a configuration example of an information supply system according to a first embodiment.

FIG. 1 is a diagram showing a configuration example of an information supply system 1 according to a first embodiment. The information supply system 1 is an information supply system that supplies information regarding performance of a battery (hereinafter assumed to be synonymous with a secondary battery) mounted in the vehicle 10. As shown in FIG. 1, the information supply system 1 includes the plurality of vehicles 10 and a center server (information supply device) 100. In the following description, of the plurality of vehicles 10, the vehicle 10 which transmits battery use status information and to which the center server 100 supplies information is referred to as a target vehicle 10X.

The center server 100 diagnoses the battery 40 mounted in the vehicle 10 based on information transmitted by the plurality of vehicles 10. The vehicles 10 communicate with the center server 100 via a network NW. The network NW includes, for example, the Internet, wide area networks (WANs), local area networks (LANs), provider apparatuses, and wireless base stations.

[Vehicle 10]

Figure 2:
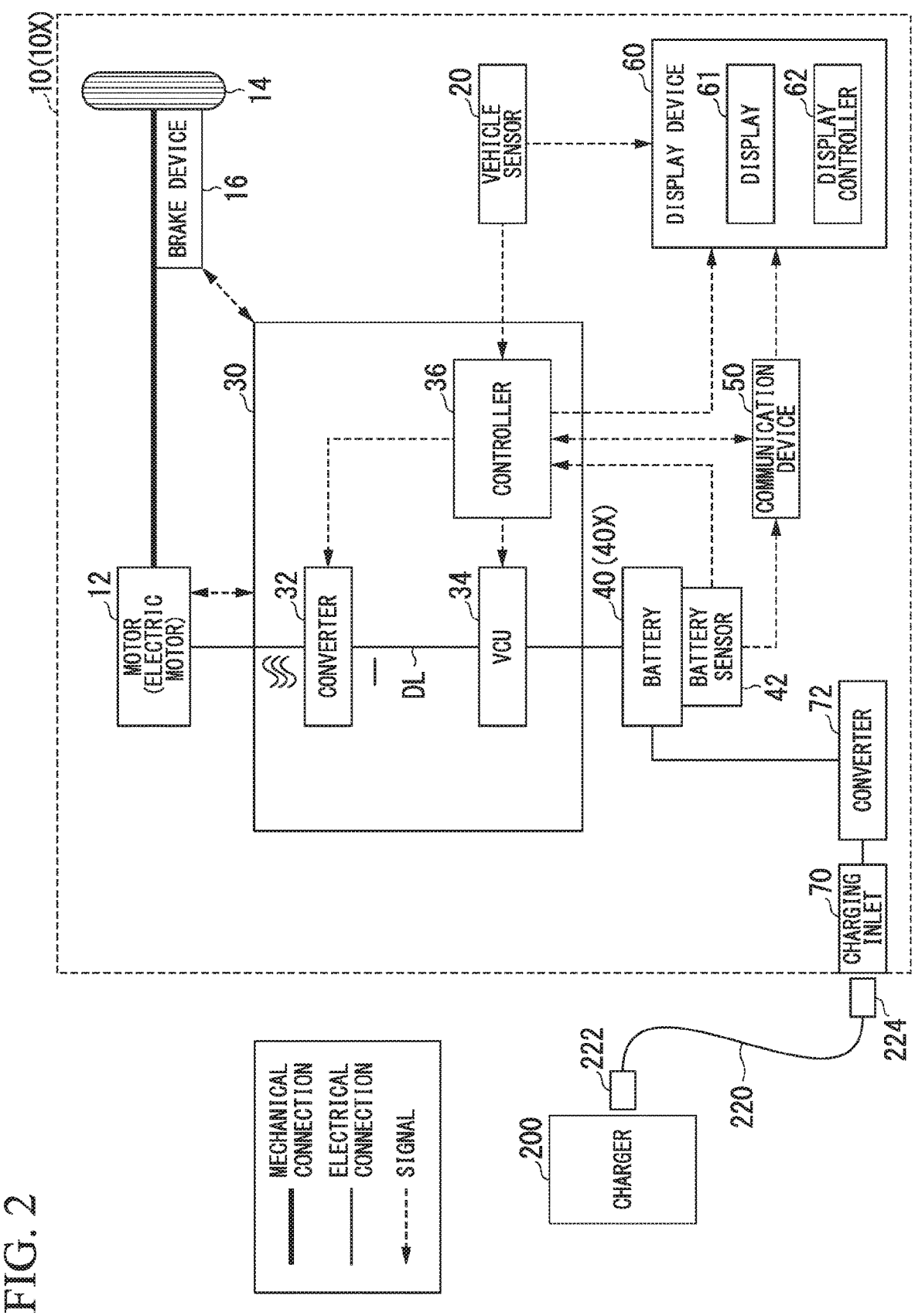
FIG. 2 is a diagram showing an example of a configuration of a vehicle.

FIG. 2 is a diagram showing an example of a configuration of the vehicle 10. As shown in FIG. 2, the vehicle 10 includes, for example, a motor 12, a driving wheel 14, a brake device 16, a vehicle sensor 20, a power control unit (PCU) 30, the battery 40, a battery sensor 42 such as a voltage sensor or a current sensor, or a temperature sensor, a communication device 50, a display device 60, a charging inlet 70, and a converter 72.

The motor 12 is, for example, a three-phase alternating-current motor. A rotor of the motor 12 is connected to the driving wheel 14. The motor 12 outputs motive power to the driving wheel 14 using supplied power. The motor 12 generates power using kinetic energy of a vehicle when the vehicle decelerates.

The brake device 16 includes, for example, a brake caliper, a cylinder that transmits a hydraulic pressure to the brake caliper, and an electric motor that generates a hydraulic pressure. The brake device 16 may include a mechanism that transmits a hydraulic pressure generated through an operation of a brake pedal to the cylinder via a master cylinder, as a backup. The brake device 16 is not limited to the above-described configuration and may be an electronic control type hydraulic brake device that transmits a hydraulic pressure of the master cylinder to the cylinder.

The vehicle sensor 20 includes an acceleration opening sensor, a vehicle speed sensor, and a brake step amount sensor. The acceleration opening sensor is mounted on an accelerator pedal which is an example of an operator that receives an acceleration instruction from a driver. The acceleration opening sensor detects an operation amount of the accelerator pedal and outputs the operation amount as an acceleration opening to a controller 36. The vehicle speed sensor includes, for example, a wheel speed sensor and a speed calculator mounted on each wheel. The vehicle speed sensor integrates wheel speeds detected by the wheel speed sensors to derive a speed of the vehicle (vehicle speed), and outputs the vehicle speed to the controller 36 and the display device 60. The brake step amount sensor is mounted on the brake pedal. The brake step amount sensor detects an operation amount of the brake pedal and outputs the operation amount as a brake step amount to the controller 36.

The PCU 30 includes, for example, a converter 32, a voltage control unit (VCU) 34, and the controller 36. A group of these constituent elements configured as the PCU 34 is merely exemplary and these constituent elements may be disposed in a distributed manner.

The converter 32 is, for example, an AC-DC converter. A direct-current side terminal of the converter 32 is connected to a direct-current link DL. The battery 40 is connected to the direct-current link DL via the VCU 34. The converter 32 converts an alternating current generated by the motor 12 into a direct current and outputs the direct current to the direct-current link DL.

The VCU 34 is, for example, a DC-DC converter. The VCU 34 boosts power supplied from the battery 40 and outputs the boosted power to the direct-current link DL.

The controller 36 includes, for example, a motor controller, a brake controller, and a battery and VCU controller. The motor controller, the brake controller, and the battery and VCU controller may be substituted with separate control devices. The motor controller, the brake controller, and the battery and VCU controller may be substituted with, for example, control devices such as a motor ECU, a brake ECU, and a battery ECU.

The motor controller controls the motor 12 based on an output from the vehicle sensor 20. The brake controller controls the brake device 16 based on an output from the vehicle sensor 20. The battery and VCU controller calculates a state of charge (SOC) of the battery 40 (hereinafter referred to as a "battery charge ratio") based on an output from the battery sensor 42 mounted in the battery 40 and outputs the SOC to the VCU 34 and the display device 60. The VCU 34 increases a voltage of the direct-current link DL in accordance with an instruction by the battery and VCU controller. The motor controller calculates an electric cost of the vehicle 10 based on a transition of the SOC of the battery 40 and the output from the vehicle sensor 20. The motor controller outputs the calculated electric cost as electric cost information to the communication device 50.

The battery 40 is, for example, a secondary battery such as a lithium-ion battery. The battery 40 stores power imported from an external charger 200 of the vehicle 10 and performs discharging to cause the vehicle 10 to travel. The battery sensor 42 includes, for example, a current sensor, a voltage sensor, and a temperature sensor. The battery sensor 42 detects, for example, a current value, a voltage value, and a temperature of the battery 40. The battery sensor 42 outputs the detected current value, voltage value, temperature, and the like to the controller 36 and the communication device 50.

The communication device 50 includes a wireless module that connects to a cellular network or a Wi-Fi network. The communication device 50 acquires battery use status information such as a current value, a voltage value, and a temperature output by the battery sensor 42 and transmits the battery use status information to the center server 100 via the network NW shown in FIG. 1. The communication device 50 transmits the electric cost information output by the motor controller of the controller 36 to the center server 100. The communication device 50 adds type information and model information of the battery of the vehicle to the battery use status information and the electric cost information to be transmitted. The communication device 50 receives information transmitted by the center server 100 via the network NW. The communication device 50 outputs the received information to the display device 60.

The display device 60 includes, for example, a display 62 and a display controller 64. The display 62 displays information in accordance with control of the display controller 64. The display controller 64 displays an image of a travelable distance (performance of the secondary battery) and a residual lifetime (performance of the secondary battery) in accordance with the information output by the controller 36 and the communication device 50 on the display 62. The display controller 64 displays a vehicle speed or the like output by the vehicle sensor 20 on the display 62.

The charging inlet 70 is provided toward the outside of the vehicle body of the vehicle 10. The charging inlet 70 is connected to the charger 200 via a charging cable 220. The charging cable 220 includes a first plug 222 and a second plug 224. The first plug 222 is connected to the charger 200 and the second plug 224 is connected to the charging inlet 70. Electricity supplied from the charger 200 is supplied to the charging inlet 70 via the charging cable 220.

The charging cable 220 includes a signal cable attached to a power cable. The signal cable relays communication between the vehicle 10 and the charger 200. Accordingly, each of the first plug 222 and the second plug 224 includes a power connector and a signal connector.

The converter 72 is provided between the battery 40 and the charging inlet 70. The converter 72 converts a current (for example, an alternating current) imported from the charger 200 via the charging inlet 70 into a direct current. The converter 72 outputs the converted direct current to the battery 40.

Figure 3:
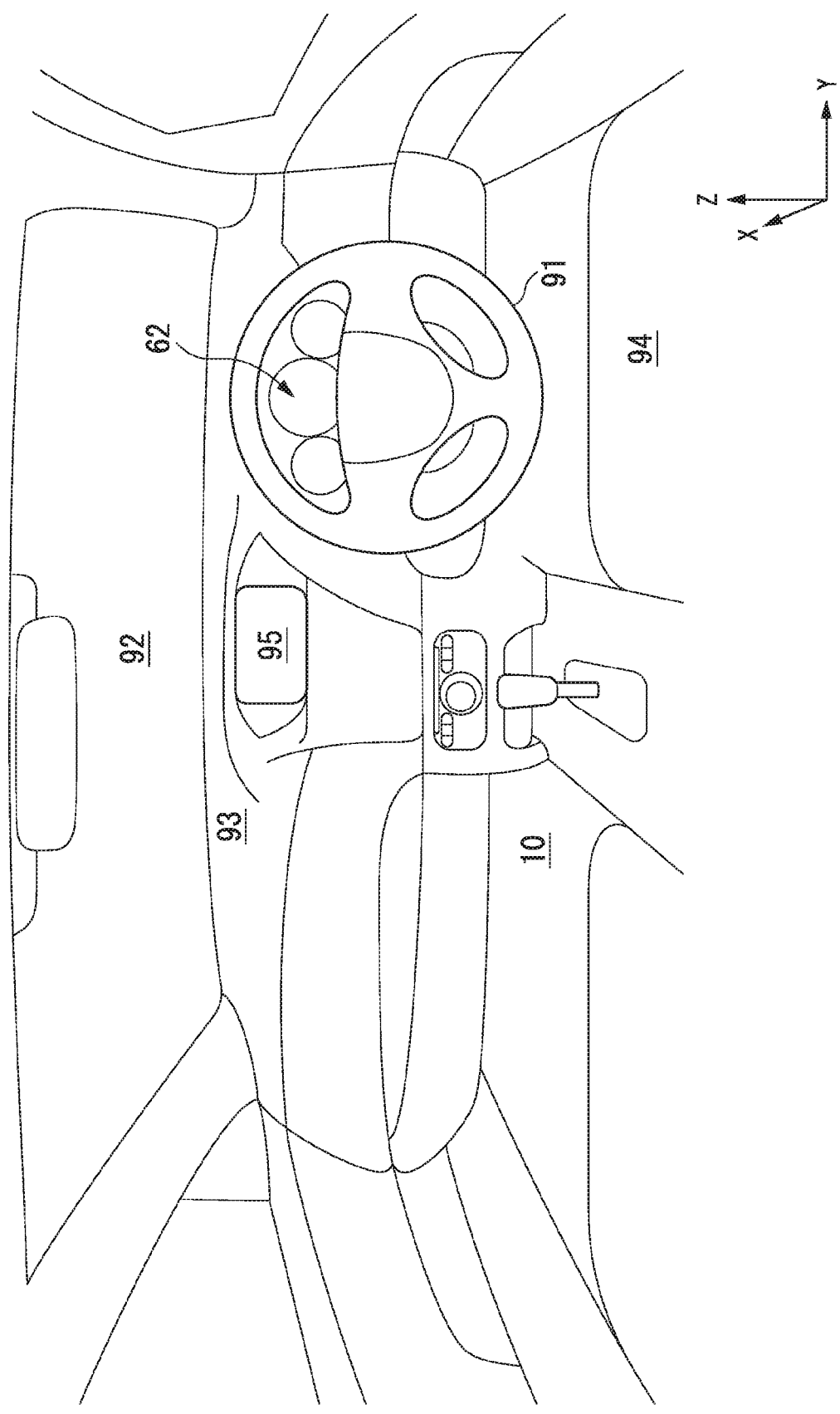
FIG. 3 is a diagram showing an example of a configuration of a vehicle interior of the vehicle.

FIG. 3 is a diagram showing an example of a configuration of a vehicle interior of the vehicle 10. As shown in FIG. 3, the vehicle 10 includes, for example, a steering wheel 91 controlling steering of the vehicle M, a front windshield 92 partitioning the outside and the inside of the vehicle, and an instrument panel 93. The front windshield 92 is a member that has a light transmission property.

The display 62 of the display device 60 is provided near the front side of a driver seat 94 in the instrument panel 93 inside the vehicle. The display 62 can be viewed through a gap in the steering wheel 91 or over the steering wheel 91 by a driver. A second display device 95 is provided in the middle of the instrument panel 93. The second display device 95 displays, for example, an image corresponding to a navigation process performed by a navigation device (not shown) mounted in the vehicle 10 or a video or the like of a partner with a videophone. The second display device 95 may display a television program, reproduce a DVD, or display content such as a downloaded movie.

[Center Server 100]

The center server 100 shown in FIG. 1 includes, for example, a communicator (acquirer) 110, a deriver 120, and a storage 150. The deriver 120 is realized, for example, by a hardware processor such as a central processing unit (CPU) executing a program (software). Some or all of the constituent elements may be realized by hardware (a circuit unit including circuitry) such as a large scale integration (LSI) circuit, an application specific integrated circuit (ASIC), a field-programmable gate array (FPGA), or a graphics processing unit (GPU) or may be realized by software and hardware in combination. The program may be stored in advance in a storage device (a storage device including a non-transitory storage medium) such as a hard disk drive (HDD) or a flash memory or may be stored in a detachably mounted storage medium (a non-transitory storage medium) such as a DVD or a CD-ROM to be installed by mounting the storage medium in a drive device. The storage 150 is realized by the above-described storage device.

The communicator 110 acquires the use status information and the electric cost information such as a current value, a voltage value, a temperature, and a lifetime elapsed time of the battery transmitted by each of the plurality of vehicles 10. The communicator 110 stores the received information for each piece of identification information of the vehicle 10 (for example, number plate information, communication identification information of the communication device 50, identification information of a registered user, or the like) as collection data 152 in the storage 150. The type information or the model information of the battery may be incorporated into the collection data 152.

On the premise that a process is performed by the center server 100, each of the plurality of vehicles 10 detects a current value, a voltage value, and a temperature of the battery 40 by the battery sensor 42 and transmits the current value, the voltage value, and the temperature as battery use status information to the center server 100 by the communication device 50. The plurality of vehicles 10 transmit the electric cost information to the center server 100 along with the battery use status information. The vehicle 10 may transmit the battery use status information and the electric cost information for each predetermined time, for example, each hour or each day, or may transmit the battery use status information based on an instruction from the user of the vehicle 10. The vehicle 10 may transmit the battery use status information in response to a request from the center server 100. The vehicle 10 may transmit the battery use status information in a case in which a predetermined condition is established, for example, in a case in which a load of the battery exceeds a given amount or an increase amount of a load of the battery at the previous transmission time is a given amount. The vehicle 10 may transmit the battery use status information at a plurality of timings. The vehicle 10 may transmit the electric cost information at a different timing from the battery use status information.

The storage 150 stores initial battery information 154 of the battery 40 mounted in the vehicle 10. The initial battery information 154 includes initial battery capacity information 154A and initial battery lower limit capacity information 154B. The initial battery capacity information 154A refers to information indicating an initial value of a battery capacity of the battery 40 (the degree of deterioration of the battery). The initial battery lower limit capacity information 154B is information indicating an initial lower limit capacity of the battery 40. An initial battery lower limit capacity is regulated in consideration of a lower limit value of the initial deterioration ratio and a lower limit value of the battery capacity that vary for each product. The initial battery lower limit capacity can be set to one numeral value between, for example, 98% and 90% of a designed value of the battery capacity. The initial battery lower limit capacity may be a different numerical value. The initial battery lower limit capacity may be determined for each type of battery or may be determined irrespective of the type of battery. The initial battery lower limit capacity may be determined for each type of battery and each model of the vehicle in which the battery is mounted.

The deriver 120 derives a travelable distance of the target vehicle 10X and a display travelable distance based on the collection data 152 and the initial battery lower limit capacity information 154B of the target vehicle 10X stored in the storage 150. The deriver 120 outputs the display travelable distance information regarding the derived display travelable distance to the communicator 110. The communicator 110 transmits the display travelable information output by the deriver 120 to the target vehicle 10X. The communicator 110 may transmit the travelable distance information regarding an actual travelable distance to the target vehicle 10X along with the display travelable distance information.

The deriver 120 derives the battery capacity of a battery mounted in the target vehicle 10X (hereinafter referred to as a "target battery") 40X based on the collection data 152 of the target vehicle 10X stored in the storage 150. The deriver 120 derives a battery deterioration ratio based on the initial battery capacity information 154A and the derived battery capacity of the target battery 40X.

The deriver 120 derives a residual lifetime (actual residual lifetime) and a display residual lifetime of the target battery 40X based on the derived battery deterioration ratio and residual lifetime derivation information 156 stored in the storage 150. The residual lifetime derivation information 156 includes a deterioration prediction formula, a lifetime determination criterion deterioration ratio, and a display lifetime calculation formula. The lifetime is, for example, a time until a battery deterioration ratio reaches a specific period guarantee value from the time of starting use of the battery. The residual lifetime is, for example, a time remaining until the battery deterioration ratio reaches the specific period guarantee value. The display residual lifetime is a display residual lifetime calculated to be shorter than an actual residual lifetime in order to display the display residual lifetime on the display 62 of the display device 60 of the target vehicle 10X.

The deriver 120 outputs display residual lifetime information regarding the derived display residual lifetime to the communicator 110. The communicator 110 transmits the display residual lifetime information output by the deriver 120 to the target vehicle 10X. The communicator 110 may transmit the residual lifetime information regarding the actual residual lifetime to the target vehicle 10X along with the display residual lifetime information.

In the target vehicle 10X, the communication device 50 receives the display travelable distance information and the display residual lifetime information transmitted by the communicator 110 of the center server 100. The communication device 50 outputs the received display travelable distance information and display residual lifetime information to the display device 60. In the display device 60, the display controller 64 displays the display travelable distance and the display residual lifetime in accordance with the display travelable distance information and the display residual lifetime information output by the communication device 50 on the display 62. The display controller 64 of the target vehicle 10X displays an image indicated as information regarding performance lower than actual performance of the battery 40 on the display 62 by displaying the display residual lifetime shorter than the actual residual lifetime on the display 62.

Figure 4:
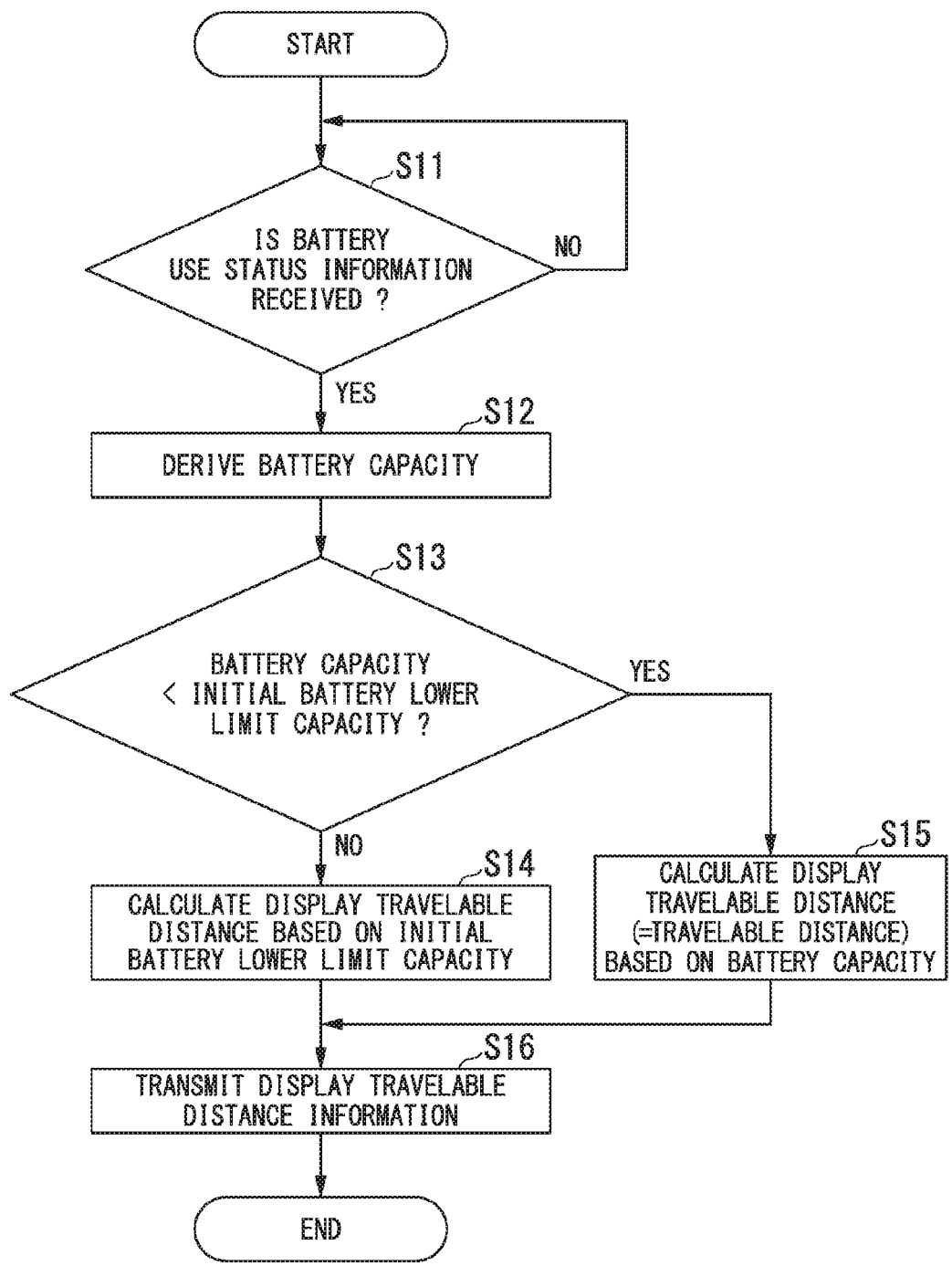
FIG. 4 is a flowchart showing an example of a flow of a process performed in each unit of a center server.
Figure 5:
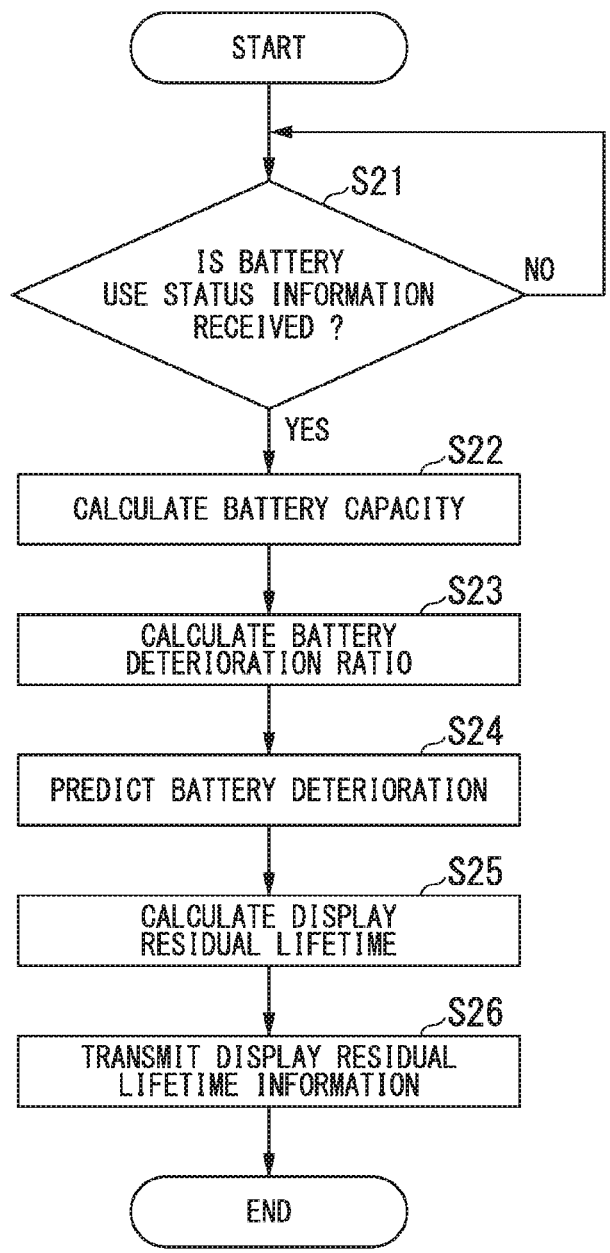
FIG. 5 is a flowchart showing an example of a flow of a process performed in each unit of a center server.

Next, a process in the center server 100 will be described in more detail. FIGS. 4 and 5 are flowcharts showing examples of flows of processes performed in each unit of the center server 100. A process from derivation to transmission of the display travelable distance in the process of the center server 100 will be described with reference to FIG. 4 and a process from derivation to transmission of the display residual lifetime in the process will be described with reference to FIG. 5. The processes shown in FIGS. 4 and 5 may be performed in a synchronized manner or may be performed in an asynchronized manner. Here, an example of the processes performed in the asynchronized manner will be described.

[Process from Derivation to Transmission of Display Travelable Distance]

As shown in FIG. 4, the center server 100 determines whether the battery use status information transmitted by the target vehicle 10X is received (step S11). In a case in which the center server 100 determines that the battery use status information is not received (NO in step S11), the center server 100 repeats the process of step S11.

In a case in which the center server 100 determines that the battery use status information is received (YES in step S11), the center server 100 outputs the battery use status information received in the communicator 110 to the deriver 120 along with the electric cost information. Subsequently, the deriver 120 of the center server 100 derives a battery capacity of the target battery 40X based on the battery use status information output by the communicator 110 (step S12). The deriver 120 calculates and derives the battery capacity based on the current value, the voltage value, and temperature of the target battery 40X.

The center server 100 reads the initial battery lower limit capacity information 154B included in the initial battery information 154 from the storage 150 and determines whether the derived battery capacity is less than the initial battery lower limit capacity (step S13). In a case in which it is determined that the derived battery capacity is not less than the initial battery lower limit capacity (the battery capacity is equal to or greater than the initial battery lower limit capacity) (NO in step S13), the deriver 120 of the center server 100 calculates the display travelable distance based on the initial battery lower limit capacity (step S14). The deriver 120 calculates the display travelable distance by dividing the initial battery lower limit capacity by the electric cost based on the electric cost information (display travelable distance=initial battery lower limit capacity/electric cost).

Conversely, in a case in which it is determined that the derived battery capacity is less than the initial battery lower limit capacity (YES in step S13), the deriver 120 of the center server 100 calculates the display travelable distance based on the derived battery capacity (step S15). The display travelable distance calculated based on the derived battery capacity is the same as the actual travelable distance. The deriver 120 calculates and derives the actual travelable distance along with the display travelable distance herein by dividing the battery capacity by the electric cost based on the electric cost information (travelable distance=battery capacity/electric cost).

Thereafter, the communicator 110 of the center server 100 transmits the display travelable distance information regarding display travelable distance calculated in step S14 or step S15 to the target vehicle 10X (step S16). In this way, the center server 100 ends the process shown in FIG. 4.

Figure 6:
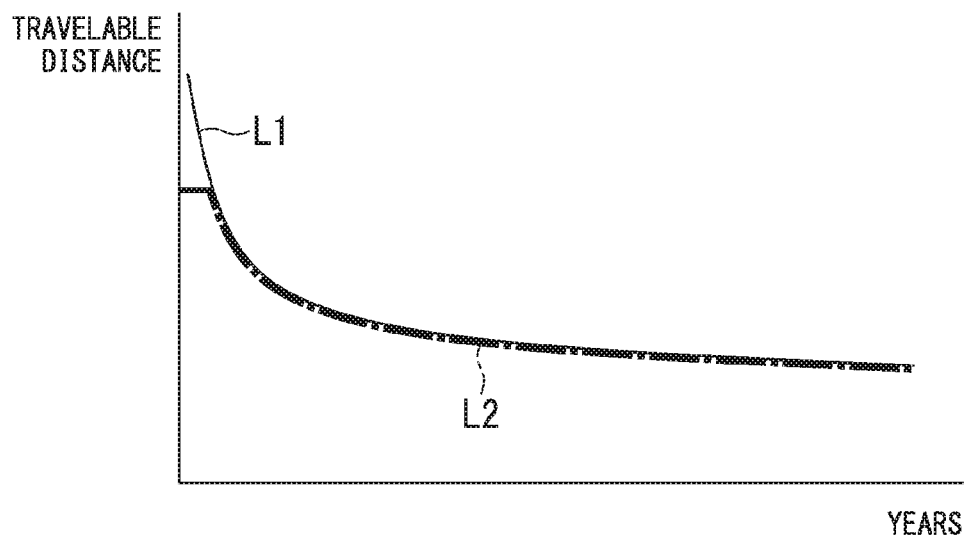
FIG. 6 is a graph showing an example of a relation between years of use of a battery and a travelable distance of a vehicle.

FIG. 6 is a graph showing an example of a relation between years of use of a battery and a travelable distance of a vehicle. In FIG. 6, a solid line L1 indicates an actual travelable distance and a one-dot chain line L2 indicates a display travelable distance. As indicated by the solid line in FIG. 6, the travelable distance of the vehicle 10 in which the battery 40 is mounted is gradually shorter as years of use of the battery 40 is longer and deterioration in the battery 40 progresses. In the battery 40, relatively large deterioration occurs at an initial stage at which a use period is short. Therefore, in the vehicle 10 in which the relatively new battery 40 is mounted, a travelable distance is long. However, due to initial deterioration of the battery 40, the degree that a travelable distance decreases as a use period passes is larger with respect to that period. Further, in the battery 40 which is a new product, a difference in a battery capacity occurs in some cases because of variation in a product.

Therefore, it is guessed that the travelable distance of the vehicle 10 in which the initial battery 40 is mounted seems to be abruptly shortened or an individual difference seems to occur. In this case, in a case in which the travelable distance of the vehicle 10 is displayed without change to present the travelable distance to a user and the actual travelable distance of the vehicle 10 is displayed as it is, the user may be likely to feel uneasy about that. In contrast, the travelable distance of the vehicle in which the initial battery 40 is mounted is a sufficiently long distance. Therefore, for example, even when a distance shorter than the actual distance is displayed, a sufficient travelable distance can be displayed. Therefore, dissatisfaction of the user is reduced.

Accordingly, the center server 100 derives a display travelable distance shorter than an actual travelable distance which is performance lower than an actual performance of the battery with regard to the travelable distance which is the performance of the battery and transmits the display travelable distance to the target vehicle 10X. Specifically, as indicated by the one-dot chain line L2 in FIG. 6, during an initial period in which years of use of the battery 40 are short, in particular, during a period in which the battery capacity of the battery 40 is equal to or greater than an initial battery lower limit capacity, the display travelable distance is set to be shorter than the actual travelable distance. Therefore, since conservative information is supplied to the user, it is possible to reduce uneasiness or dissatisfaction of the user consequently.

The display travelable distance herein is expressed with Min(D(t), Dupper). In this formula, D(t) is a travelable distance calculated based on the battery capacity of the battery 40 and Dupper is a travelable distance calculated based on the initial battery lower limit capacity.

[Process from Derivation to Transmission of Display Residual Lifetime]

Next, a process from derivation to transmission of the display residual lifetime will be described with reference to FIG. 5. As shown in FIG. 5, the center server 100 determines whether the battery use status information transmitted by the target vehicle 10X is received (step S21). In a case in which the center server 100 determines that the battery use status information is not received (NO in step S21), the center server 100 repeats the process of step S11.

In a case in which the center server 100 determines that the battery use status information is received (YES in step S21), the communicator 110 of the center server 100 outputs the battery use status information received by the communicator 110 to the deriver 120 and stores the battery use status information as the collection data 152 in the storage 150. Subsequently, the deriver 120 of the center server 100 calculates the battery capacity of the target battery 40X based on the battery use status information output by the communicator 110 (step S22). The deriver 120 calculates and derives the battery capacity based on the current value, the voltage value, and temperature of the target battery 40X.

Subsequently, the deriver 120 of the center server 100 reads the initial battery capacity information 154A included in the initial battery information 154 and calculates a battery deterioration ratio of the target battery 40X (step S23). The deriver 120 calculates the battery deterioration ratio of the target battery 40X by dividing the battery capacity of the target battery 40X by the initial battery capacity (battery deterioration ratio=battery capacity/initial battery capacity).

After the deriver 120 calculates the battery deterioration ratio of the target battery 40X, the deriver 120 reads a deterioration prediction formula included in the residual lifetime derivation information 156, for example, a route law, from the storage 150 and performs battery deterioration prediction of the target battery 40X (step S24). The deriver 120 performs the battery deterioration prediction by performing application to the route law. For example, the deriver 120 obtain a deterioration amount of the capacity of the target battery 40X and an elapsed time at the time of deterioration of the capacity of the target battery 40X and performs the battery deterioration prediction of the target battery 40X based on a route of the deterioration amount of the capacity and an elapsed time at the time of deterioration of the capacity.

The deriver 120 reads a lifetime determination deterioration ratio (predetermined deterioration ratio) and a display lifetime calculation formula included in the residual lifetime derivation information 156. The deriver 120 calculates and derives a residual lifetime and a display residual lifetime of the battery based on a result of the battery deterioration prediction of the target battery 40X performed in step S24 and the lifetime determination deterioration ratio and the display lifetime calculation formula included in the residual lifetime derivation information 156 (step S25).

Figure 7:
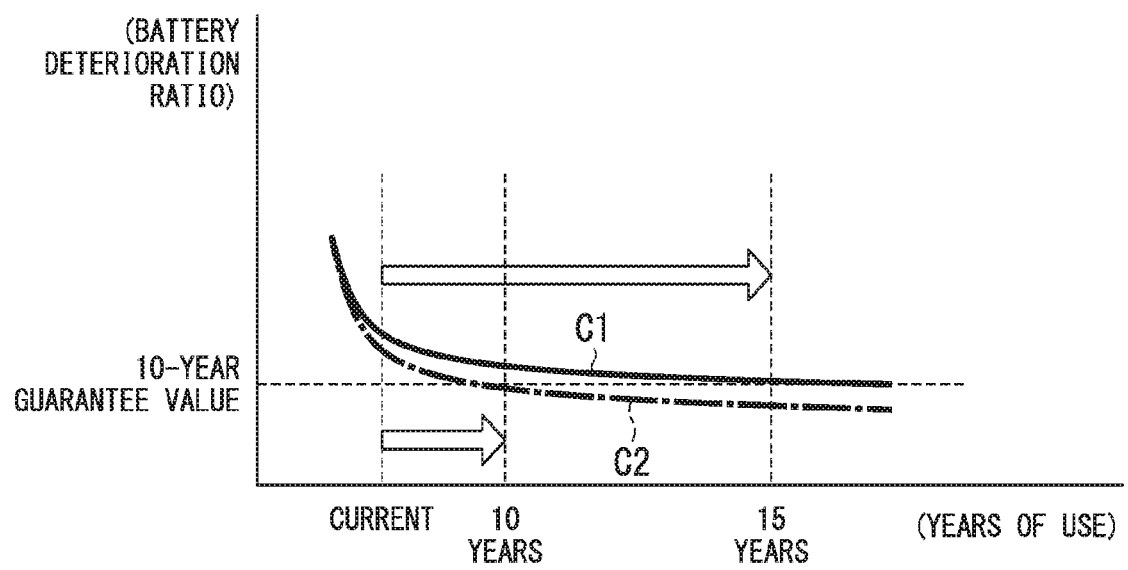
FIG. 7 is a graph showing an example of a chronological change of a battery deterioration ratio of a target battery.

Here, prediction of battery deterioration and derivation of the display residual lifetime will be described. FIG. 7 is a graph showing an example of a chronological change of a battery deterioration ratio of the target battery 40X. In FIG. 7, a chronological change of the battery deterioration ratio of the target battery 40X is indicated by a solid line C1. In the battery 40, a specific period guarantee value is stored as a lifetime determination deterioration ratio. The specific period guarantee value is a battery deterioration ratio at which it is necessary to exchange or repair of the battery 40. A specific period is a period in which the change or the repair of the battery 40 is guaranteed when guarantee of the battery 40 is equal to or less than the specific period guarantee value before this period passes. In this example, the specific period is assumed to be 10 years. In FIG. 7, the specific period guarantee value (a guarantee value of 10 years) is shown.

The specific period is, for example, an average value or a maximum value of periods in which the battery deterioration ratio of the battery 40 of a user (a user for which battery deterioration progress is fast) included in a lower limit 36 is the specific period guarantee value. The specific period may be another period or may be, for example, a period other than the average vale or the maximum value of the periods in which the battery deterioration ratio of the battery 40 of a user included in a lower limit 36 is the specific period guarantee value. Alternatively, the specific period may be set to a value or the like obtained based on a period in which the battery deterioration ratio of the battery 40 of the user included in a lower limit 2σ or 1σ is the specific period guarantee value.

In FIG. 7, a chronological change of the battery deterioration ratio of the battery 40 of the user of the lower limit 36 is indicated by a one-dot chain line C2. As shown in FIG. 7, while the battery deterioration ratio of the target battery 40X is a value when a period is 15 years until the specific period guarantee value, the battery deterioration ratio of the battery 40 of the user of 36 is a value when a period is 10 years until the specific period guarantee value. In this way, for a normal user including the user of the target battery 40X, a period in which the battery deterioration ratio of the battery 40 is equal to or less than the specific period guarantee value is longer than 10 years which is the specific period.

In the example of FIG. 7, a period in which the battery deterioration ratio of the target battery 40X is the specific period guarantee value is predicted to be 15 year from use start. Therefore, a residual lifetime of the target battery 40X is a period obtained by subtracting a period passing from the use start of the target battery 40X from 15 years. The residual lifetime of the battery 40 of the user of 36 is a period obtained by subtracting the period passing from the use start of the battery 40 from 10 years. The display residual lifetime is calculated as a period shorter than the residual lifetime. The deriver 120 obtains the residual lifetime obtained from the battery deterioration ratio of the battery 40 of the user of 36 as the display residual lifetime of the target battery 40X.

Figure 8:
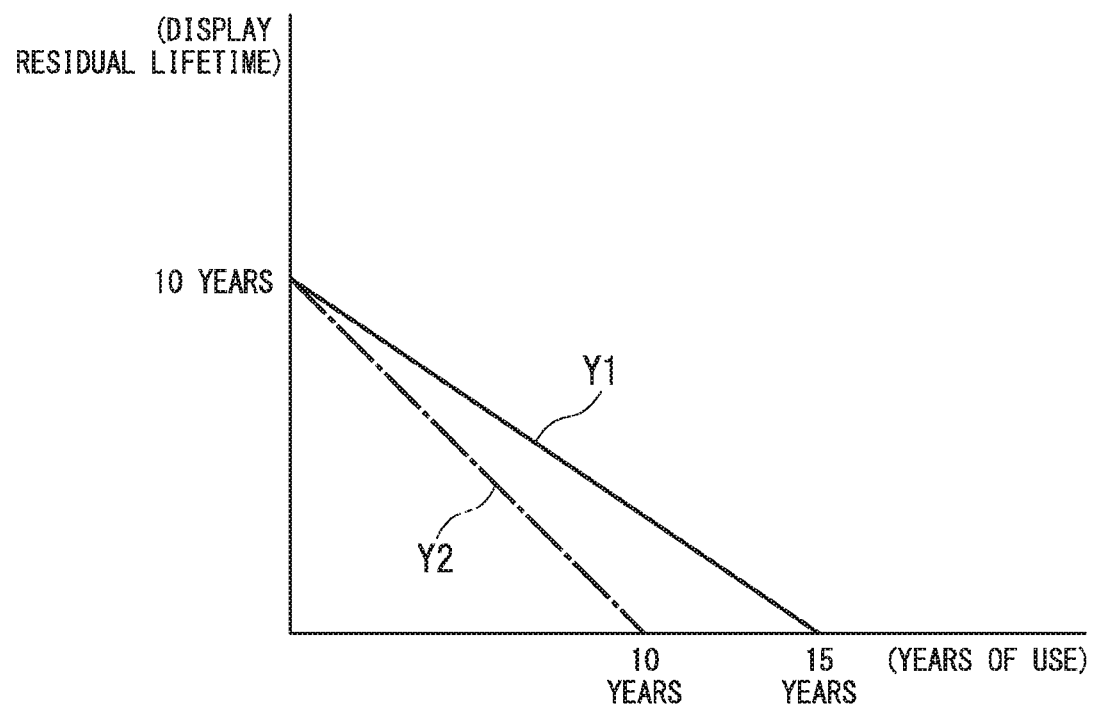
FIG. 8 is a graph showing an example of a relation between a display residual lifetime and years of use of the target battery.

FIG. 8 is a graph showing an example of a relation between a display residual lifetime and years of use of the target battery 40X. In FIG. 8, a relation between the display residual lifetime and the years of use of the target battery 40X is indicated by a solid line Y1. A relation between a residual lifetime and years of use of the battery 40 of the user of 36 is indicated by a one-dot chain line Y2. The deriver 120 derives a display residual lifetime by performing correction in which a lifetime obtained by actually calculating the lifetime of the battery 40 is assumed to be reduced to a specific period. For example, when the lifetime of the target battery 40X is calculated as 15 years, the deriver 120 performs correction to the display residual lifetime in which the lifetime of the target battery 40X is assumed to be 10 years.

Figure 9:
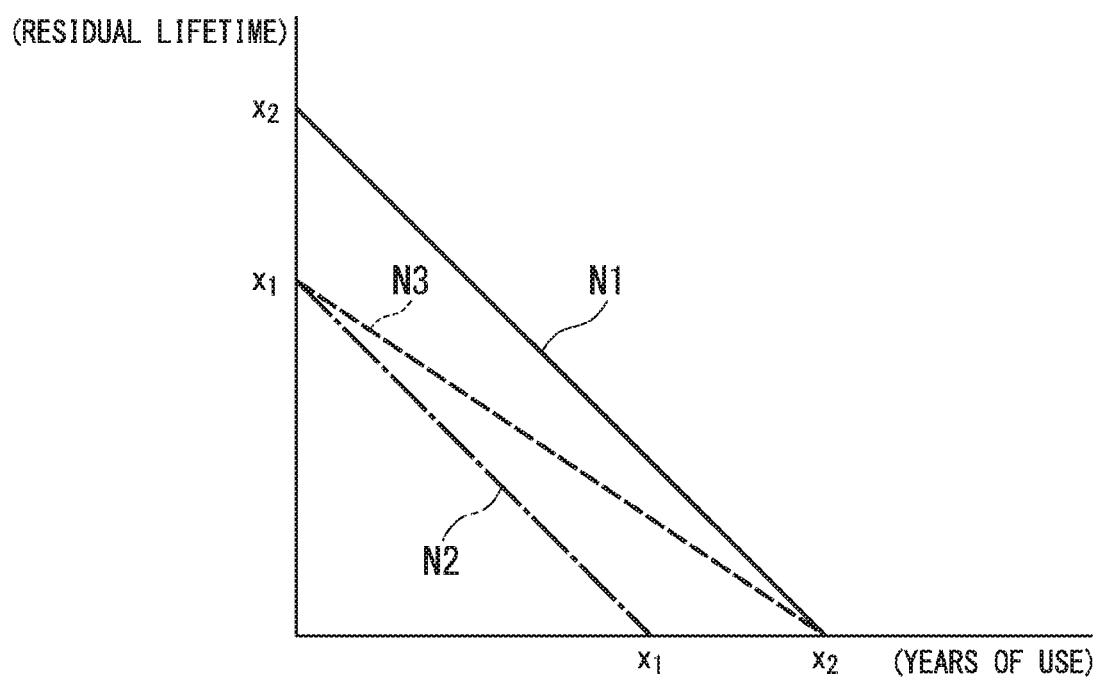
FIG. 9 is a graph showing an example of a relation between a residual lifetime and years of use of a battery.

A correction formula when the residual lifetime of the battery 40 is corrected to the display residual lifetime will be described. FIG. 9 is a graph showing an example of a relation between a residual lifetime and years of use of the battery 40. In FIG. 9, a relation between the display residual lifetime and the years of use of the target battery 40X is indicated by a solid line N1. A relation of a residual lifetime and years of use of the battery 40 of the user of 36 is indicated by a one-dot chain line N2.

As shown in FIG. 9, it is assumed that the lifetime of the target battery 40X is x2 years and the lifetime of the battery of the user of 36 is x1 years. In order to correct the residual lifetime of the target battery 40X and calculate the display residual lifetime, correction in which a straight line indicated by a solid line N1 shown in FIG. 9 is converted into a straight line indicated by a dotted line N3 may be performed. When t is the horizontal axis of FIG. 9, L(t) is the straight line indicated by the solid line N1, and L'(t) is the straight line indicated by the dotted line N3, L'(t) is expressed in Formula (1) below. Formula (1) is a display lifetime calculation formula. Herein, in the example, $x_1$ is 10 years and $x_2$ is 15 years.

$$L(t)' = L(t)\{x_1/x_2 + t(x_2 - x_1)/x_2^2\} \quad (1)$$

After the deriver 120 derives the display residual lifetime, the communicator 110 of the center server 100 transmits the display residual lifetime information regarding the derived display residual lifetime to the target vehicle 10X (step S26). Then, the center server 100 ends the process shown in FIG. 5.

In the target vehicle 10X, the communication device 50 shown in FIG. 1 receives the display travelable distance information and the display residual lifetime information transmitted by the communicator 110 of the center server 100. The communication device 50 outputs the received display travelable distance information and display residual lifetime information to the display device 60. The display controller 64 of the display device 60 displays the display travelable distance and the display residual lifetime on the display 62 based on the output display travelable distance information and display residual lifetime information.

Similarly to the case described in the process from the derivation to the transmission of the display travelable distance, the center server 100 derives performance lower than actual performance of the battery as the performance of the battery and transmits the performance to the target vehicle 10X. Herein, the performance of the battery is the residual lifetime and the performance lower than the actual performance of the battery is the display residual lifetime. Therefore, since the conservative information is supplied to the user, uneasiness or dissatisfaction of the user can consequently be reduced. In the first embodiment, the process from the derivation to the transmission of the display travelable distance and the process from the derivation to the transmission of the display residual lifetime are performed independently, but these processes may be performed continuously.

According to the above-described first embodiment, the deriver 120 of the center server 100 derives the travelable distance of the target vehicle 10X and the residual lifetime of the target battery 40X. The deriver 120 derives the display travelable distance of the target vehicle 10X and the display residual lifetime of the target battery. Herein, the display travelable distance of the target vehicle 10X shorter than the travelable distance is derived and the display residual lifetime shorter than the residual lifetime is derived.

The display controller 64 of the display device 60 of the target vehicle 10X displays the display travelable distance and the display residual lifetime on the display 62. Therefore, the travelable distance and the residual lifetime shorter than the actual travelable distance of the target vehicle 10X and the actual residual lifetime of the target battery 40X are present to the user. The user recognizes the travelable distance or the display residual lifetime indicated as the display travelable distance and the display residual lifetime. However, the actual travelable distance or residual lifetime are longer than the recognized lengths. Accordingly, the conservative information is given to many users. Thus, since many users can get feelings of profit on the travelable distance or the residual lifetime, dissatisfaction of the users can consequently be reduced. The deriver 120 of the center server 100 derives the display travelable distance based on the initial battery lower limit capacity with regard to the travelable distance derived based on the battery capacity of the battery 40 which is a new product. Therefore, since a travelable distance shorter with respect to the battery 40 in a period in which a variation in performance of the new product is large and deterioration progress is large is displayed, dissatisfaction of a user can be further reduced.

The deriver 120 of the center server 100 corrects the residual lifetime of the target battery 40X and derives the display residual lifetime using the residual lifetime of the battery 40 of the user of 36. Therefore, for the battery 40 of many users, it is possible to derive the display residual lifetime shorter than the residual lifetime and it is possible to display a residual lifetime close to an actual residual lifetime as a display residual lifetime. Accordingly, it is possible to reduce dissatisfaction of the users.

Second Embodiment

Figure 10:
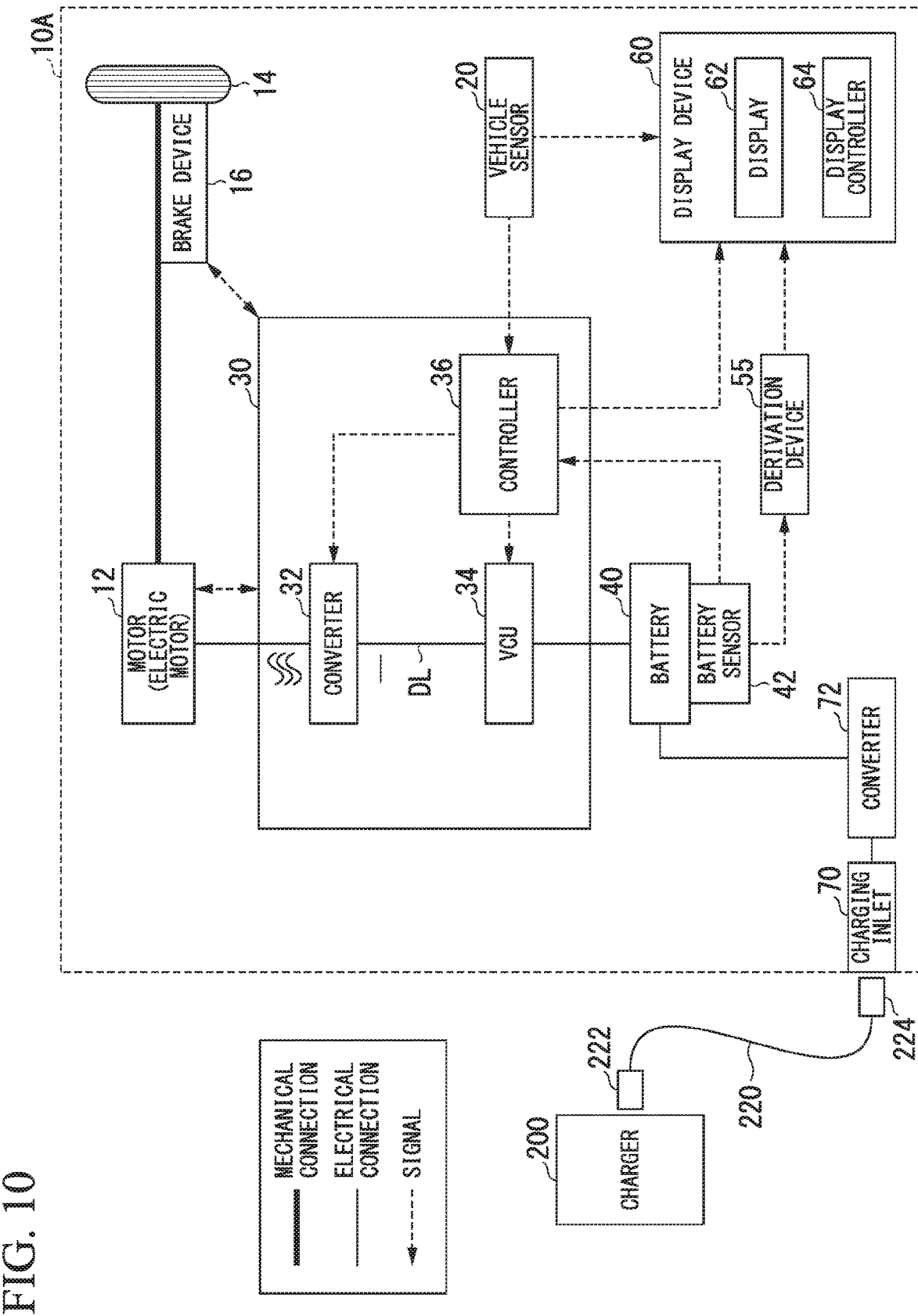
FIG. 10 is a diagram showing an example of a configuration of a vehicle according to a second embodiment.

Next, a second embodiment will be described. FIG. 10 is a diagram showing an example of a configuration of a vehicle 10A according to the second embodiment. The configuration of the second embodiment is different from the configuration of the first embodiment in that a constituent element that has similar performance to the deriver 120 provided in the center server 100 is provided as a derivation device 55 in the vehicle 10A. Without providing a communication device, the battery sensor 42 outputs a detected current value, voltage value, temperature, and the like to the controller 36 and the derivation device 55. The other points are substantially common to the foregoing configuration of the first embodiment. Hereinafter, a process in the second embodiment will be described focusing on differences from the first embodiment.

The derivation device 55 includes a deriver that has a similar configuration to the deriver 120 of the first embodiment and a storage that has a similar configuration to the storage 150. The storage of the derivation device 55 stores initial battery information (initial battery capacity information and an initial battery lower limit capacity) and residual lifetime derivation information in the vehicle 10A. In the vehicle 10A, according to the second embodiment, the derivation device 55 derives a travelable distance and a display travelable distance based on battery use status information of the battery 40 or the like output by the battery sensor 42 and the initial battery information stored in the storage. The derivation device 55 derives a residual lifetime and a display residual lifetime based on the battery use status information of the battery 40 or the like output by the battery sensor 42, the residual lifetime derivation information stored the storage, and the like. The derivation device 55 outputs the derived display travelable distance and display residual lifetime to the display device 60. The display device 60 causes the display controller 64 to display the display travelable distance and the display residual lifetime output by the derivation device 55 on the display 62.

According to the above-described second embodiment, similarly to the first embodiment, a user is informed of the travelable distance and the residual lifetime shorter than the actual travelable distance of the target vehicle 10X and the actual residual lifetime of the target battery 40X. Therefore, the actual travelable distance and the residual lifetime are longer than the recognized lengths. Accordingly, the conservative information is given to many users. Thus, since many users can get feelings of profit on the travelable distance or the residual lifetime, dissatisfaction of the users can consequently be reduced.

In the second embodiment, without transmitting and receiving information to and from the center server 100, the display travelable distance and the display residual lifetime can be derived and displayed in the vehicle 10A. Accordingly, it is possible to reduce a load on the center server 100. According to the second embodiment, the vehicle 10A does not include a communication device that communicates with the center server 100, but may include a communication device. The initial battery information or the like may be stored in a storage of a server and the vehicle 10A and the information may be caused to be transmitted to the center server 100.

Modification Examples

In each of the foregoing embodiments, the display device 60 displays the display travelable distance and the display residual lifetime received by the communication device 50 on the display 62 of the target vehicle 10X, but may display the display travelable distance and the display residual lifetime on another target object. For example, instead of or in addition to the display controller 64 of the display device 60 in the target vehicle 10X that displays the display travelable distance and the display residual lifetime on the display 62, a display controller of the second display device 95 shown in FIG. 3 may display the display travelable distance and the display residual lifetime on the display of the second display device 95. Alternatively, one of the display travelable distance and the display residual lifetime may be displayed on the display 62 of the display device 60 and the other of the display travelable distance and the display residual lifetime may be displayed on the second display device 95. Alternatively, the display travelable distance and the display residual lifetime may be displayed on an information terminal or the like carried by the user or the like of the target vehicle 10X.

Some of the processes performed by the center server 100 may be performed on the side of the vehicle 10 or some of the processes performed on the side of the vehicle 10 may be performed by the center server 100. In this case, in accordance with generated information, information transmitted and received between the vehicle 10 and the center server 100 may be appropriately determined.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information supply device comprising:
    an acquirer configured to acquire information regarding a degree of deterioration of a secondary battery for supplying travel power of a vehicle;
    a deriver configured to derive performance of the secondary battery based on the information acquired by the acquirer; and
    a display controller configured to cause a display to display an image indicating information regarding performance of the secondary battery, the performance indicated by the image being lower than the performance derived by the deriver,
    wherein
        the information regarding the degree of deterioration in the secondary battery comprises a battery capacity of the secondary battery or information for deriving the battery capacity, and the information regarding the performance of the secondary battery comprises a travelable distance of the vehicle, wherein the display controller is configured to:

cause the display to display the travelable distance of the vehicle calculated based on the battery capacity in a case in which the battery capacity is less than an initial battery lower limit capacity; and cause the display to display the travelable distance of the vehicle calculated based on the initial battery lower limit capacity instead of the battery capacity in a case in which the battery capacity is equal to or greater than the initial battery lower limit capacity.

2. The information supply device according to claim 1, wherein the deriver is configured to:

derive a deterioration ratio of the secondary battery based on the information regarding the degree of deterioration of the secondary battery; and derive a residual lifetime until the derived deterioration ratio reaches a predetermined deterioration ratio as information indicating the performance of the secondary battery.

3. The information supply device according to claim 2, wherein the display controller is configured to cause the display to display a residual lifetime shorter than the residual lifetime derived by the deriver as a display residual lifetime.

4. The information supply device according to claim 3, wherein the deriver is configured to:

calculate an actual residual lifetime of a secondary battery mounted in a target vehicle; and correct the actual residual lifetime to be shorter than that of the secondary battery mounted in the target vehicle to derive the display residual lifetime.

5. An information supply method comprising the steps of:

acquiring, by a computer, information regarding a degree of deterioration of a secondary battery for supplying travel power of a vehicle;

deriving, by the computer, performance of the secondary battery based on the acquired information; and causing, by the computer, a display to display an image indicating information regarding performance of the secondary battery, the performance indicated by the image being lower than the derived performance, wherein the information regarding the degree of deterioration in the secondary battery comprises a battery capacity of the secondary battery or information for deriving the battery capacity, and the information regarding the performance of the secondary battery comprises a travelable distance of the vehicle, wherein the causing of the display to display the image comprises:

causing the display to display the travelable distance of the vehicle calculated based on the battery capacity in a case in which the battery capacity is less than an initial battery lower limit capacity; and causing the display to display the travelable distance of the vehicle calculated based on the initial battery lower limit capacity instead of the battery capacity in a case in which the battery capacity is equal to or greater than the initial battery lower limit capacity.

6. A non-transitory computer-readable storage medium that stores computer executable program instructions by a computer to perform at least:

acquiring information regarding a degree of deterioration of a secondary battery for supplying travel power of a vehicle;

deriving performance of the secondary battery based on the acquired information; and causing a display to display an image indicating information regarding performance of the secondary battery, the performance indicated by the image being lower than the derived performance, wherein the information regarding the degree of deterioration in the secondary battery comprises a battery capacity of the secondary battery or information for deriving the battery capacity, and the information regarding the performance of the secondary battery comprises a travelable distance of the vehicle, wherein the causing of the display to display the image comprises:

causing the display to display the travelable distance of the vehicle calculated based on the battery capacity in a case in which the battery capacity is less than an initial battery lower limit capacity; and causing the display to display the travelable distance of the vehicle calculated based on the initial battery lower limit capacity instead of the battery capacity in a case in which the battery capacity is equal to or greater than the initial battery lower limit capacity.

* * * * *